United States Patent [19]

Braithwaite

[11] Patent Number: 4,868,471
[45] Date of Patent: Sep. 19, 1989

[54] CONTROL OF PUSHER MECHANISMS ASSOCIATED WITH A GLASSWARE FORMING MACHINE

[75] Inventor: David Braithwaite, Doncaster, United Kingdom

[73] Assignee: Emhart Industries, Inc., Farmington, Conn.

[21] Appl. No.: 189,279

[22] Filed: May 2, 1988

[30] Foreign Application Priority Data

May 19, 1987 [GB] United Kingdom ................ 8711824

[51] Int. Cl.$^4$ ............................................. G05B 19/10
[52] U.S. Cl. ................................. 318/567; 198/418.1; 198/418.7
[58] Field of Search ................................. 318/567–569, 318/600–601, 603, 638, 640, 652, 49, 85; 198/412, 420, 422, 418.1, 418.2, 418.3, 418.7, 418.8, 418.9

[56] References Cited

U.S. PATENT DOCUMENTS

| | | | |
|---|---|---|---|
| 3,923,147 | 12/1975 | Quinn | 318/85 |
| 4,168,458 | 9/1979 | Bouwman | 318/603 |
| 4,203,752 | 5/1980 | Becker et al. | 65/163 |
| 4,313,750 | 2/1982 | Lulejian et al. | 65/160 |

*Primary Examiner*—William M. Shoop, Jr.
*Assistant Examiner*—David Martin
*Attorney, Agent, or Firm*—Spencer T. Smith

[57] ABSTRACT

The pusher mechanism (14) associated with an I.S. glassware forming machine (10) are controlled by a controller (30) which provides control signals which cause the mechanisms (14) to operate. The controller senses the passage past a particular location of ware (1 to 6) of ware as it is transported by a conveyor (16) on to which the pusher mechanisms (14) transfer the ware. The controller determines the spacing (s1 to S5) on the conveyor (16) of ware from different sections (12) of the machine (10), compares the spacing with a predetermined, desired, spacing and, in the event that said spacing differs from said predetermined spacing by more than a predetermined tolerance, advances or retards the supply of control signals to at least one of the pusher mechanisms (14) which transfers the ware concerned.

4 Claims, 1 Drawing Sheet

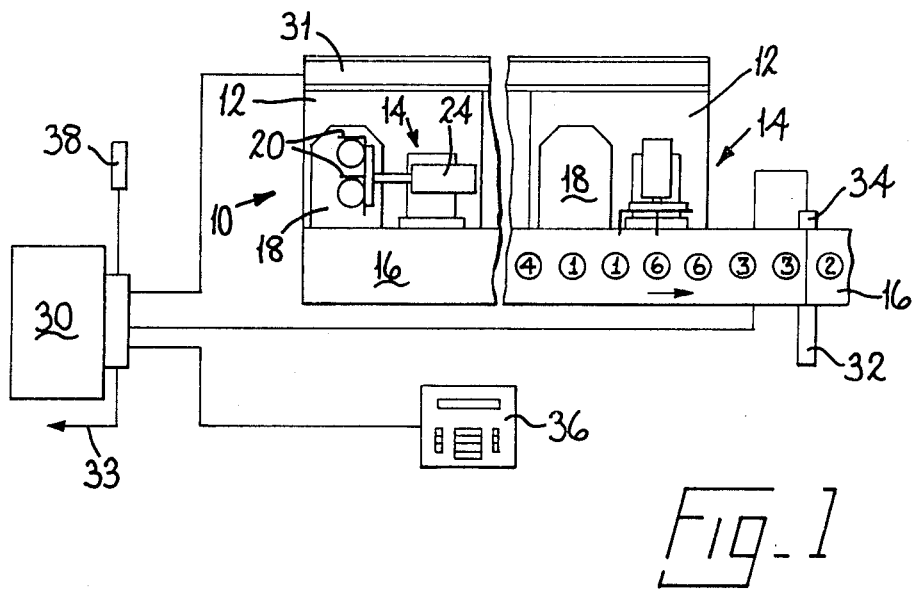
Fig_1
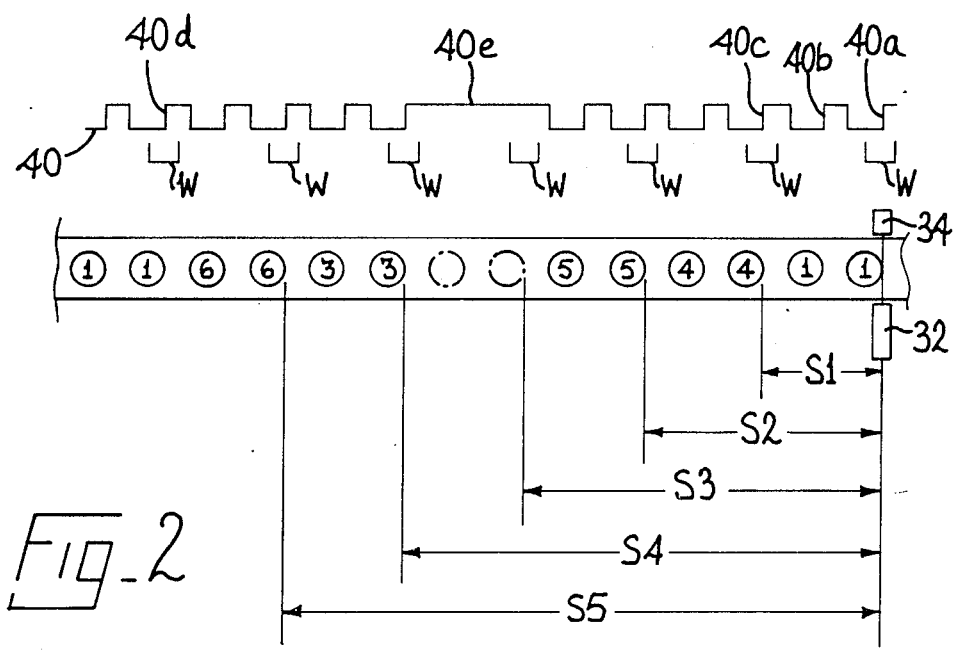
Fig_2

CONTROL OF PUSHER MECHANISMS ASSOCIATED WITH A GLASSWARE FORMING MACHINE

BACKGROUND OF THE INVENTION

This invention is concerned with methods of controlling and controllers for controlling the operation of a plurality of pusher mechanisms each of which is associated with one of the sections of a glassware forming machine of the individual section type.

Glassware forming machines of the individual section type are well known and comprise a plurality of individual glassware forming sections arranged side-by-side. The sections of the machine receive gobs of molten glass from a common source in turn according to a predetermined sequence. Each section moulds the gobs it receives into pieces of glassware and deposits them on a deadplate associated with the section. The sections operate within an overall machine cycle with phase differences between their operations, the overall machine cycle being the period between successive deliveries of gobs to the same section. For a six section machine, if the machine cycle is represented by 360 degrees, the phase difference between one section and the next section in the predetermined sequence will be 60 degrees. A section may form one, two, three or even four pieces of ware simultaneously from a like number of gobs supplied simultaneously thereto. The basic principle of the individual section, or I.S., machine is described in U.S. patent specification No. 1911119.

The ware formed by an I.S. machine is transported away from the machine on a conveyor which is common to all the sections and runs parallel to the row of sections past the deadplates. In order to transfer ware formed by the sections from the deadplate on to the conveyor, pusher mechanisms are arranged alongside the conveyor adjacent the deadplate. Each pusher mechanism is associated with one of the sections and is operable, once in each cycle of the machine, to transfer ware formed by its associated section on to the conveyor from the deadplate on which the section has deposited the ware. The pusher mechanisms operate successively in a predetermined sequence which is normally the same sequence as that in which the sections are operated.

Each pusher mechanism normally comprises one or more fingers, one for each piece of ware formed simultaneously by its associated section, which in the operation of the mechanism are brought into contact with ware on the deadplate, are moved arcuately to sweep the ware on to the conveyor, and are then retracted from the ware. An example of such a pusher mechanism is described in U.S. patent specification No. 3249200.

The speed of the conveyor needs to be synchronised with the operation of the pusher mechanisms to ensure that all the ware can be transferred to the conveyor without interference with ware already on the conveyor. Furthermore, it is desirable for the subsequent handling of the ware, if the ware on the conveyor is evenly spaced. In order to achieve this synchronisation, conventionally, the conveyor drives a cam shaft on which cams associated with each pusher mechanism are mounted. The cam associated with a particular pusher mechanism starts the operation of its associated pusher mechanism by operating a pneumatic valve to admit operating air to the mechanism. In this arrangement, however, the relative timings of the pusher mechanisms cannot be easily adjusted to take account of variations in the speed of operation of the pusher mechanism which may develop over a period of time. More recently, see e.g. U.S. patent specification No. 4203752 and European patent specification No. 0048133, the pusher mechanisms have been started by electrical control signals derived from the machine controller but, while these can more easily be adjusted, the need for adjustment and the amount of adjustment required depends on observation by an operator and trial-and-error.

It is an object of the present invention to provide a method of controlling the operation of pusher mechanisms of the type referred to in which the timing of the control signals is automatically adjusted to equalise the spacing of ware on the conveyor.

BRIEF SUMMARY OF THE INVENTION

The invention provides a method of controlling the operation of a plurality of pusher mechanisms each of which is associated with one of the sections of a glassware forming machine of the individual section type, the pusher mechanisms being arranged alongside a common conveyor which is operable to transport ware away from the machine and each pusher mechanism being operable, on receipt of a control signal, once in each cycle of the machine, to transfer ware formed by its associated section on to the conveyor, the pusher mechanisms being operated successively in a predetermined sequence, the method comprising sensing the passage past a particular location of ware as it is transported by the conveyor and producing successive signals representing the passage of successive pieces of ware past said location, determining from said successive signals the spacing on the conveyor of ware formed by different sections of the machine, comparing said spacing with a predetermined spacing, and advancing or retarding the supply of control signals in the machine cycle to at least one of the pusher mechanisms associated with said different sections in the event that said spacing differs from said predetermined spacing by more than a predetermined tolerance.

In a method in accordance with the last preceding paragraph, the actual spacing of ware on the conveyor is determined and used to adjust the supply of control signals so that the spacing is continuously monitored and attempts made to equalise the spacing.

In order to simplify the method, preferably the time of the supply of a control signal within a cycle to a particular section is never advanced or retarded and ware from that section is used as a datum from which spacings are measured. The timing of one pusher mechanism is, thus, always regarded as correct and the timing of the other pusher mechanisms is adjusted relative thereto. A fixed reference point is therefore provided once in each cycle so that errors cannot become cumulative.

As sections are sometimes closed down for maintenance, repair etc. or sometimes produce obviously defective ware which an operator will knock off the conveyor into a cullet chute, gaps sometimes occur in the ware on the conveyor caused by the absence of a contribution from a particular section. In order to prevent such gaps from causing unnecessary and erroneous adjustment of the timings of the pusher mechanisms, it is advantageous if time windows are established during which ware is expected to pass said location and, if no ware is sensed within a particular time window, the advancing or retarding step is not carried out. Thus, if ware from a particular section is missing, no ware will be sensed in a particular time window and no adjustments will be made.

Advantageously, said sensing is carried out by shining a beam of light across the conveyor at said particular location and detecting interruptions in said beam caused by the passage of ware. The beam of light may advantageously be light from a low-powered laser.

The invention also provides a controller for controlling the operation of a plurality of pusher mechanisms each of which is associated with one of the sections of a glassware forming machine of the individual section type, the pusher mechanisms being arranged alongside a common conveyor which is operable to transport ware away from the machine and each pusher mechanism being operable, on receipt of a control signal, to transfer ware formed by its associated section on to the conveyor, the controller being operable to provide such control signals to the pusher mechanisms to cause them to operate successively in a predetermined sequence with each pusher mechanism being operated once in each cycle of operation of the machine, the controller comprising sensing means operable to sense the passage past a particular location of ware as it is transported by the conveyor and to produce successive signals representing the passage of successive pieces of ware past said location, determining means arranged to receive said successive signals from the sensing means and operable to determine from said signals the spacing on the conveyor of ware formed by different sections of the machine, comparing means operable to compare the spacing determined by the determining means with a desired spacing and to produce a signal if said spacing differs from said desired spacing by more than a predetermined tolerance, and timing adjustment means operable in response to the signal produced by the comparing means to advance or retard the supply of control signals within the cycle to at least one of the pusher mechanisms which has transferred the ware formed by said different sections on to the conveyor.

BRIEF DESCRIPTION OF THE DRAWINGS

There now follows a detailed description, to be read with reference to the accompanying drawings, of a controller and a method of controlling which are illustrative of the invention. It is to be understood that the illustrative controller and the illustrative method have been selected by way of example and not of limitation of the invention.

In the drawings:

FIG. 1 is a diagrammatic view of the illustrative controller showing it in relation to an I.S. glassware forming machine; and FIG. 2 is a diagrammatic view of a conveyor transporting ware away from the I.S. glassware forming machine of FIG. 1 showing signals and spacings in relation to the ware on the conveyor.

DETAILED DESCRIPTION OF PREFERRED EMBODIMENT OF THE INVENTION

The illustrative method of controlling and the illustrative controller are described hereinafter in relation to a six section I.S. machine 10 with each section 12 operating to form two pieces of ware simultaneously. Details of the section 12 are not pertinent to this description and are omitted from the drawings. However, it will be understood that suitable modifications of the illustrative method and illustrative controller can be utilised with I.S. machines having different numbers of sections and with the sections operating to form different numbers of pieces of ware simultaneously. The sections 12 are numbered, for convenience, 1 to 6 starting from the left hand side of FIG. 1. The pieces of ware are given reference numbers from 1 to 6 depending on which section formed them, i.e. ware numbered 1 was formed by section 1 and so on. The I.S. machine is described as having the firing order 1, 4, 3, 6, 5, 2, i.e. section 1 is followed by section 4 in the machine cycle and so on. It will be understood, however, that other firing orders are possible.

Six pusher mechanisms 14 operate with the I.S. machine 10, each mechanism 14 being associated with one of the sections 12. The pusher mechanisms 14 are arranged alongside a common conveyor 16 which is operable to transport ware away from the machine. Each pusher mechanism 14 is operable, on receipt of a control signal, to transfer ware formed by its associated section 12 from a deadplate 18 of the section on to the conveyor 16. Each pusher mechanism 14 comprises two fingers 20 mounted on a horizontally extending piston rod 22 of a piston and cylinder assembly 24. The assembly 24 is mounted for reciprocating turning movement through approximately 90 degrees about a vertical axis and the pusher mechanism also comprises means (not shown) for carrying out this turning movement. On receipt of a control signal, the assembly 24 of a pusher mechanism 14 operates to extend the fingers 20 across the deadplate 18 so that each finger is adjacent a piece of ware (the pusher mechanism 14 of section 1 is shown in this condition in FIG. 1). Next, the assembly 24 is turned about the vertical axis so that the fingers 20 push the ware on to the conveyor 16 with an arcuate movement. Next, the assembly 24 operates to retract the fingers 20 from the ware (the pusher mechanism 14 of section 6 is shown in this condition in FIG. 1). Finally, the assembly 24 is turned back about the vertical axis.

The pusher mechanisms 14 receive their control signals (which, as mentioned above, cause them to commence their operation) from a controller comprising a computer 30. The computer 30 is operable to provide such control signals to the pusher mechanisms 14 to cause them to operate successively in a predetermined sequence with each pusher mechanism being operated once in each cycle of operation of the machine. The order in which the pusher mechanisms 14 are operated is the same as the firing order of the sections 12. The control signals are supplied to solenoid valves of the pusher mechanisms 14 contained in an air manifold 31.

The controller also comprises sensing means operable to sense the passage past a particular location, downstream of the machine 10, of ware as it is transported by the conveyor 16 and to produce successive signals representing the passage of successive pieces of ware past said location. The sensing means comprises means for shining a beam of light across the conveyor 16 at said location, said means being provided by a low power laser 32. The sensing means also comprises a receiving means, in the form of a photo-electric cell 34, operable to receive said beam and generate signals when the passage of ware interrupts said beam. When the cell 34 receives the beam, it provides an electrical signal to the computer 30 and the absence of said electrical signal signals to the computer 30 the presence of a piece of ware at said location.

A terminal 36 is connected to the computer 30 to enable an operator to inform the computer of necessary parameters such as the number of pieces of ware formed simultaneously by a section 12, and the firing order. The computer 30 also receives an input from a sensor 38 which senses the speed of the machine 10, i.e. the length of the machine cycle.

The computer 30 is programmed to provide determining means arranged to receive the successive signals from the cell 34 and operable to determine from said signals the spacing on the conveyor 16 of ware formed by different sections of the machine 10. FIG. 2 illustrates the order in which ware passes the sensing means. This order is not the same as the firing order, being 1, 4, 5, 2, 3, 6. Thus, two pieces of ware from section 1 pass the sensing means followed by two from section 4 and so on. The determining means is programmed to regard signals representing the passage of ware from a particular section as representing a datum from which spacings on the conveyor are to be measured. Thus, the arrival of the first piece of ware from, for example section 1, is regarded as the datum and the determining means resets itself. The trace 40 shows the signals produced by the sensing means 32,34 and the datum is set at the falling edge 40a of the signal produced by the first piece of ware from section 1.

As shown in FIG. 2, the computer 30 expects that the next piece of ware to arrive after datum is also from section 1 and accordingly the determining means ignores the next signal 40b from the sensing means 32,34. However, the next signal 40c is expected to be caused by a piece of ware from section 4 and the determining means operates to determine the spacing S1 between the first piece of ware from section 1 and the first piece of ware from section 4, i.e. the spacing between the signals 40a and 40c. The spacing S1 is, therefore, measured as a time interval but this is equivalent to measuring the distance between the pieces of ware as the conveyor 16 runs at constant speed, being in this case three section widths per cycle. It would also be possible to use the signals 40b and 40c for a spacing measurement. All the spacings measured are from signal 40a, these being S1 between ware from sections 1 and 4; S2 between ware from sections 1 and 5; S3 between ware from sections 1 and 2 (the ware from section 2 is shown as missing in FIG. 2 but its intended position on the conveyor 16 is indicated by broken lines); S4 between ware from sections 1 and 3; and S5 between sections 1 and 6.

When a spacing has been determined by the determining means, comparing means programmed into the computer 30 is operable to compare the spacing with a desired spacing fed in via the terminal 36. The desired spacing for comparison with S2 is twice that for S1 and so on. If the spacing differs from said desired spacing by more than a predetermined tolerance, also fed in via the terminal 36, a signal is produced representing the amount and sign of the difference. This signal is supplied to timing adjustment means programmed into the computer 30 and operable in response to the signal produced by the comparing means to advance or retard the supply of a control signal within the cycle to one of the pusher mechanisms 14 which has transferred the ware involved in the spacing measurement on to the conveyor 16. Thus, if S1 is found to be outside the tolerance, the supply of a control signal to the pusher mechanism 14 associated with section 4 is altered. If the spacing is too small, the supply of the control signal is retarded whereas, if it is too large, the supply of the control signal is advanced. The amount of the alteration is proportional to the amount by which the spacing differs from the desired spacing.

As mentioned above, the determining means is programmed to regard signals, such as 40a, representing the passage of ware from a particular section, in this case section 1, as representing a datum from which spacings S1 to S5 on the conveyor 16 are to be measured. This being the case, the control signal to said section is not advanced or retarded. The next datum after 40a is indicated by 4d in FIG. 2.

As mentioned above, it sometimes happens that ware from a particular section is missing from the conveyor 16. In FIG. 2, the ware from section 2 is shown as missing giving rise to a period indicated by 40e when no signals are produced by the sensing means 32,34. In order to avoid difficulties which would arise if the determining means became confused as to which section had formed the ware giving rise to a particular signal, time window generating means is programmed into the computer 30 and is operable to generate time windows W during which ware is expected to pass the location of the sensing means 32,34. The determining means is programmed, in the event that no ware is sensed within a particular time window, to proceed to the next spacing. Thus, in the example illustrated in FIG. 2, no ware is sensed in the window W associated with section 2 and the determining means instead of determining S3 proceeds to determine S4. In the event that ware from section 1 is missing, the determining means is programmed to change the datum to ware from the next following section on the conveyor, in this case section 4. If the spacings exceed predetermined limits or if ware is not sensed for a considerable period, the computer 30 produces ware reject or alarm signals on a line 33.

The illustrative method, therefore, comprises:

generating time windows W during which ware is expected to pass the location of the sensing means 32,34;

sensing, using the sensing means 32,34, the passage of ware past said location as it is transported by the conveyor 16 and producing successive signals 40a etc. representing the passage of successive pieces of ware past said location, determining from the signals 40a etc. the spacing, e.g. S1, on the conveyor 16 of ware from different sections of the machine, e.g. 1 and 4, the spacing being measured from a datum provided by the passage of ware formed by a particular section, e.g. 1, the time of supply of a control signal to that section never being advanced or retarded, and, if no ware is sensed within a particular time window, the determining means proceeding to the next spacing, e.g. S2, so that no advancing or retarding is carried out;

comparing said spacing, e.g. S1, with a predetermined spacing, and advancing or retarding the supply of control signals in the machine cycle to at least one of the pusher mechanisms 14 associated with said different sections in the event that said spacing differs from said predetermined spacing by more than a predetermined tolerance.

I claim:

1. A pushout system for sequentially transferring containers cyclically deposited on a plurality of deadplates to a moving conveyor comprising a pushout associated with each deadplate for displacing a container from the associated dead plate onto the moving conveyor, means for actuating each of said pushouts in a selected timed sequence so that when a container from each of said deadplates is transferred to the moving conveyor, the transferred containers will be equally spaced along the conveyor, said actuating means including means for defining the desired spacing between selected containers being carried by the conveyor, means including stationary container sensing means adjacent the conveyor for determining the actual spacing between selected containers being carried by the conveyor, means for identifying the pushout which transferred a container onto the conveyor from the order of the containers passing said sensing means, and means for changing the time when a pushout is actuated to reduce any difference between the desired spacing between the last container transferred to the conveyor by said pushout and another container, and the actual spacing thereof.

2. A pushout system according to claim 1, wherein said desired spacing between selected containers is constant.

3. A pushout system according to claim 2, wherein said sensing means comprises means for directing a beam of light across the conveyor so that it will be intercepted by a container being carried by the conveyor and receiving means for receiving said beam of light.

4. A pushout system according to claim 3, wherein said determining means comprises means for establishing time windows during which containers transferred to the conveyor from a selected pushout will intercept said light beam.

* * * * *